United States Patent [19]
Nickell et al.

[11] Patent Number: 5,868,523
[45] Date of Patent: Feb. 9, 1999

[54] IN-SITU DEEP REMEDIATION INJECTION SYSTEM AND METHOD

[76] Inventors: Jerry D. Nickell, 62 Spotted Deer Dr., Woodlands, Tex. 77381; Richard P. Steele, 3132 University Dr., Houston, Tex. 77005

[21] Appl. No.: 709,472

[22] Filed: Sep. 5, 1996

[51] Int. Cl.[6] .................................. B09C 1/02; B09C 1/10
[52] U.S. Cl. ........................... 405/128; 111/7.4; 166/246; 210/170; 210/747; 405/263; 588/900
[58] Field of Search .............................. 166/246; 210/170, 210/747; 111/118, 7.1, 7.2, 7.3, 7.4; 405/128, 263, 264, 269; 435/262.5; 588/900

[56] References Cited

U.S. PATENT DOCUMENTS

| | | | |
|---|---|---|---|
| 3,649,533 | 3/1972 | Reijonen et al. | 210/170 X |
| 4,429,647 | 2/1984 | Zinck | 111/118 |
| 4,786,212 | 11/1988 | Bauer et al. | 405/263 X |
| 4,834,194 | 5/1989 | Manchak, Jr. | 405/128 X |
| 5,133,625 | 7/1992 | Albergo et al. | 405/128 X |
| 5,246,309 | 9/1993 | Hobby | 405/128 |
| 5,511,907 | 4/1996 | Tabasco | 405/128 |
| 5,645,377 | 7/1997 | Kauschinger et al. | 405/128 X |

*Primary Examiner*—George A. Suchfield
*Attorney, Agent, or Firm*—Parks and Associates P.C.

[57] ABSTRACT

This invention relates to a deep remediation injection system for in-situ remediation of contaminated soil and ground water capable of progressive penetration both vertically and horizontally in contaminated soil and ground water having a soil penetrating lance for injecting air and oxygen and liquid with suspended biologicals into the contaminated soil as said soil penetrating lance is inserted for penetration in the soil, an air compressor for compressing air and delivering the air under pressure to the soil penetrating lance on one end, a liquid pump for pressurizing the liquid and suspended biologicals and delivering said liquid and suspended biologicals under pressure to the soil penetrating lance on one end, a gas connector control for connecting the gas compressor to the lance and for controlling the compressed gas flow, and a liquid connector means for connecting the liquid pump to the lance and controlling the pressurized liquids; and the method of developing a treatment grid both as to the depth of treatment and as to spacing of penetration holes in said contaminated soil, activating a compressed gas source for injection, and activating a pressured water source for injection, driving the soil penetrating lance into the contaminated soil, stopping said lance penetration at levels of penetration for time sufficient to treat the soil, and driving the soil penetrating lance into said contaminated soil to the next stop for treatment until the whole in-situ remediation site has been treated.

16 Claims, 6 Drawing Sheets

IN-SITU DEEP REMEDIATION INJECTION SYSTEM AND METHOD

FIELD OF INVENTION

This invention relates to deep remediation injection systems for biological in-situ remediation of contaminated soil and ground water by progressive penetration both vertically and horizontally in contaminated soil and ground water using biologicals under high pressure and low volume with the system of this invention in conjunction with the methods of this invention.

BACKGROUND OF THE INVENTION

The prior arts use of biologicals for soil and water remediation is well developed but their means of delivery varied widely. For example some applications have used large boring devices to drill holes in the contaminated soil and set casing into the hole but leave the hole open at the bottom to receive the treatment biologicals for biological remediation. This type of remediation is a very expensive system and very cumbersome and required large equipment. This type of bioremediation system also does not provide a fine adjustment of the remediation process because it relies upon a few large holes and not many small ones to tightly control the treatment area.

Also the prior art using the drilled holes and set casing required large drilling equipment to make the holes and large pipe handling equipment to set the pipe in the holes.

Yet another problem with the large bore hole biological approach is that it requires open ground and no structure overhead so that a drilling machine can be brought in to drill the hole. Thus in these type applications if any structure was in the way it would have to be removed in order to drill the hole and set the casing. This large bore hole biological approach could not therefore be used under slabs or foundations or under storage tanks without the removal of the structure.

There have even been cases where high pressure gas and oxygen have been added to the set casing hole to help drive the biologicals out into the surrounding soil to effect treatment. In some cases this approach using high pressure and large volumes has caused the contaminates to migrate and only spread the contaminates to other areas. The very concept of treatment relied upon migration to effect the bioremediation from it injection source. Also if and when high pressure was applied to the bore holes there has been a tendency to over pressure near the hole and have under pressure occur further out from the hole, again relying on the passive migration to adjust the imbalance.

In some cases the prior art has provided trenches or drilled in collection lines at the bottom of these contaminated areas to collect the contaminates driven to these drilled in collection lines for the purpose of collecting the driven contaminate for above ground treatment and reinjection back into the ground after treatment.

Also in the prior art are many other forms of remediation such as the removal of the contaminated soil to be delivered to a treatment site for incineration to burn off the contaminates and leave only clean soil after the process. This has been a very expensive process for remediation and cost is a very important factor in the remediation business for those firms who must be involved in remediation. It also can have the pollution side effect of vapor and air pollution while the soil is being removed and moved to the incineration site if not controlled, but the control adds cost to the process also.

Yet other prior art has used biologicals instead of incineration of the hauled off dirt at a remote treatment site in a controlled above ground treatment of the contaminated soil. This approach has many pollution problems such as possible water pollution and air pollution, and is also very expensive. It clearly means handling the soil twice, once on removal and once on completed treatment, just as incineration does.

Most of the prior art was and is designed and used in solo applications and does not work with the other remediation techniques. For example the removal of contaminated soils to a treatment site for bioremediation of soil would not generally work with or in conjunction with the bored hole and casing approach of bioremediation except in the case of a requirement of double treatment of the contaminated soil.

OBJECTS OF THE INVENTION

It is the object of this invention to provide an in-situ soil and ground water deep injection remediation system for the remediation of contaminated soil and ground water with out disturbing the soil in place and which is relatively inexpensive.

A further object is to provide a remediation system which is easy to handle and is accurate in its delivery of the biologicals both as to location and as to concentrations, and can provide fine adjustments to the treatment process for superior remediation results.

It is also an object of this invention to develop a system which may be used by itself or in conjunction with other remediation techniques to enhance the overall treatment of contaminated soil.

Also it is an object of this invention to provide a treatment system which provides a delivery of high pressure gas and liquid, but in low volumes so that the contaminates in the soil are not driven out in to other areas or spread by migration.

Yet another object of this invention is to provide treatment access to subsurface soils that are difficult to treat such as contaminated soils underneath storage tanks, foundations, roadways, rails and even buildings. Prior to this to effect treatment meant the necessity of extensive excavation and then complex application equipment was required to introduce biologicals and nutrients, water and air to the contaminated soil for bioremediation.

It is an object of this invention to provide good even control of the hydraulic gradient and level pressures even close to the point of injection of the biologicals, nutrients, water and air for maximum effective treatment.

A further object of this invention is to provide a very portable system, which may be moved from one location to another easily by a light weight vehicle.

Further it is an object to deliver biologicals, and liquids to a specific situs for continuous treatment of the soil column from the surface down to clean soil and be able to adjust the application of the biologicals, nutrients, water, air, surfactants, and other chemicals in the process of the treatment as the contaminated soil is penetrated.

It is also an object to have a system which allows the operator to make a physical measurement of the depth of penetration by the movement of the handle from one position to another as a means of measurement of the penetration.

Yet another object is to provide a means to add extensions to the lance of this invention to allow it to be extended from 6 to 12 feet long to a full length of at least 45 feet and still keep the gas and liquid in communicative flow and in their respective tubing until injected into the soil for mixing.

Also it is an object to provide a nozzle which assists the operator in the penetration of the soil at the same time it is delivering the liquid to the contaminated soil to be treated.

DETAILED DESCRIPTION OF EMBODIMENTS

Figure 1:
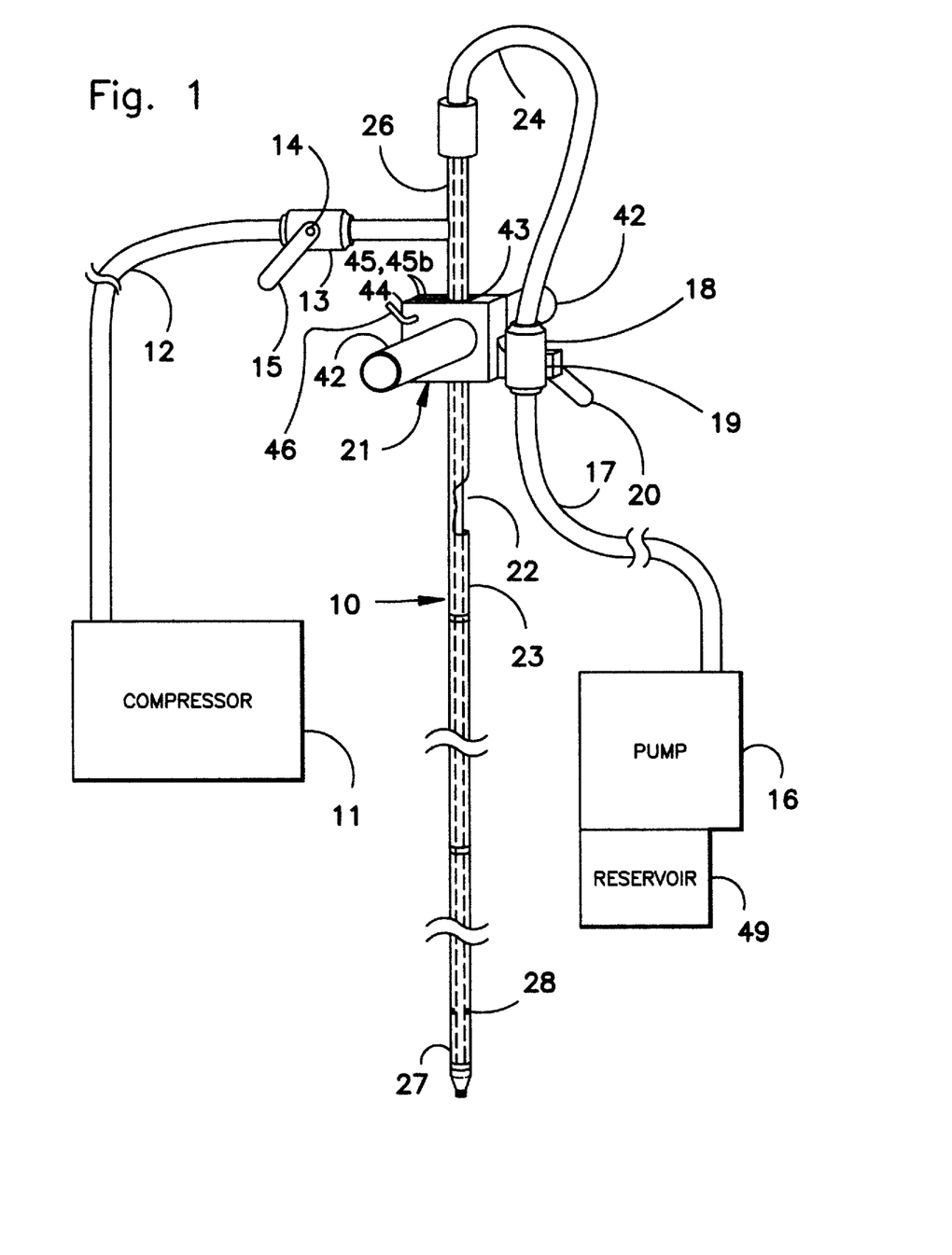
FIG. 1 is a perspective view of the lance of this invention which shows the first tubular member in hidden lines, second tubular member, handle, gas connector valve, liquid pump connector valve and the compressor and pump with a reservoir.
Figure 2:
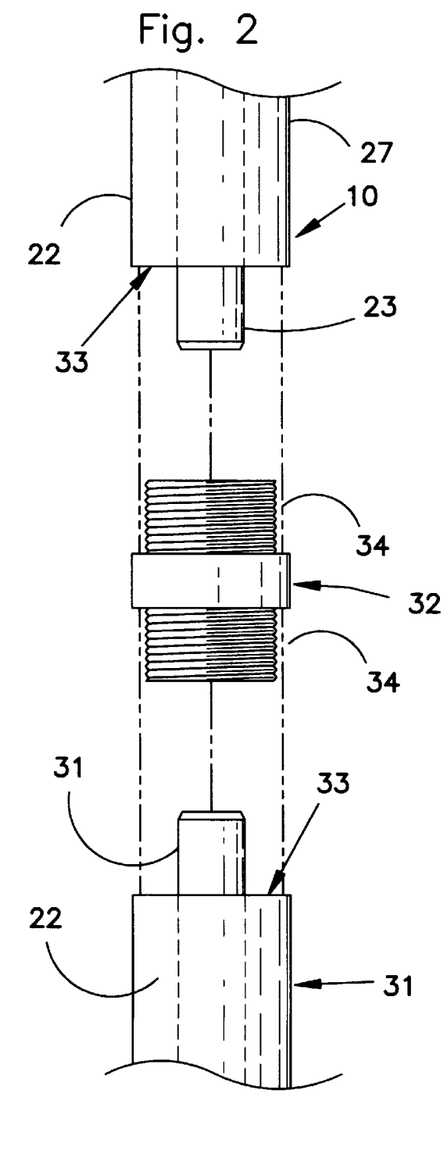
FIG. 2 is an exploded view of the joining of the adapter tube with an extension member.
Figure 3:
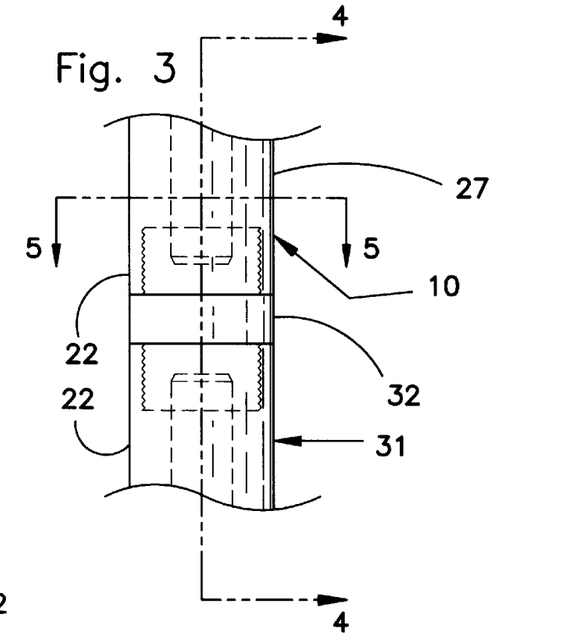
FIG. 3 is a side view showing the adapter tube and an extension member joined.
Figure 4:
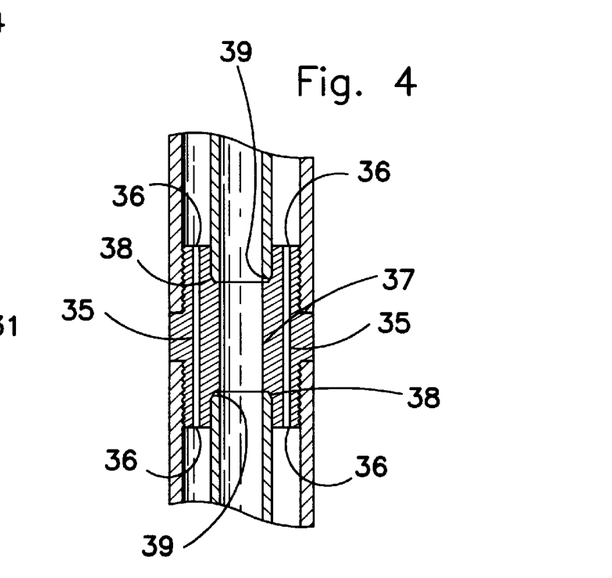
FIG. 4 is a crosssectional view of FIG. 3 taken through FIG. 3 at points 4—4.
Figure 5:
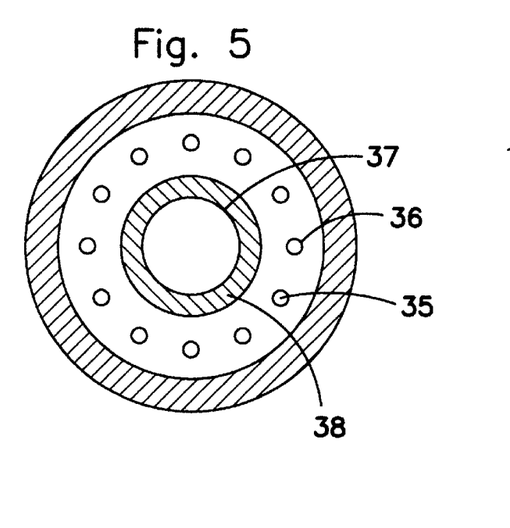
FIG. 5 is a crossectional view of FIG. 3 taken through FIG. 3 at points 5—5.
Figure 6:
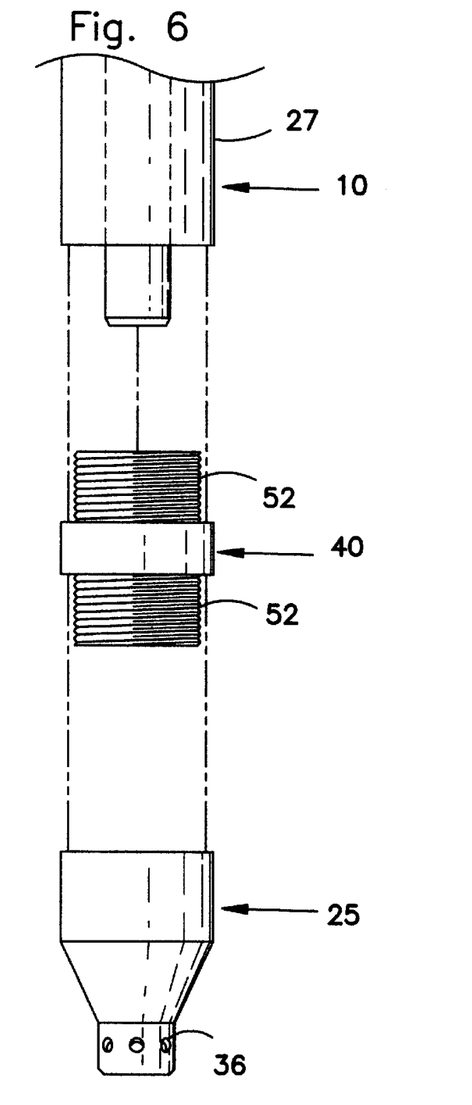
FIG. 6 is an exploded view of nozzle member and an adaptor nozzle member.
Figure 7:
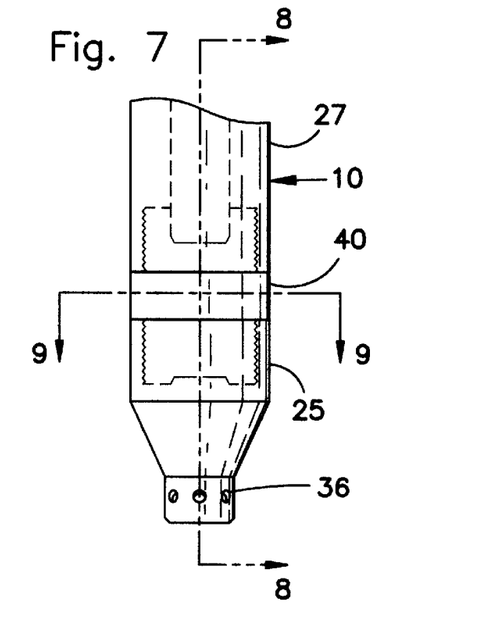
FIG. 7 is a side view showing the adaptor nozzle member and nozzle member connected.

Referring now to FIG. 1, the general reference 10, shows the soil penetrating lance of this invention connected in fluid communication to an air compressor 11 at one end 26 of the soil penetrating lance 10. The connection is through compressed gas tube 12 to a gas connection valve 13, which has a control valve 14. The control valve 14 is connected to a handle 15 to allow the operator to open and close the flow of the compressed gas from the air compressor to the soil penetrating lance 10.

Also the soil penetrating lance 10 of this invention is connected in fluid communication to a liquid pump 16 with a liquid reservoir 49 at one end 26 of the soil penetrating lance 10. The connection is through a liquid connector tube 17 to a liquid connection valve 18, which has a control value 19. The control valve 19 is connected to a handle 20 to allow the operator to open and close the flow of the pressurized liquid from the liquid pump 16 to the soil penetrating lance 10. The liquid connection valve 18 and control valve 19 are connected to the lance handle 21 as a convenience to the operator, so that the operators hands do not have to move much distance to open or close the liquid control valve 19 with the handle 20.

The body of the soil penetrating lance 10 is composed of a first tubular member 22 and a second tubular member 23. The first tubular member 22 which is connected to a liquid tube 24 in connection with liquid connection valve 18 is for the delivery of the pressurized liquids therethrough and for feeding into the first tubular member 22 for discharge under pressure into the contaminated soil. The second tubular member 23 which is connected to gas connection value 13 has the gas connection valve 13 mounted directly to the second tubular member 23 also as a way to fee up the operators hands. It can also be seen in FIG. 1 that the first tubular member 22 is located inside the second tubular member 23 but also has a diameter sufficient to receive the first tubular member 22 and still allow sufficient compressed gas flow room therethrough for injecting air into the contaminated soil for mixing with the pressurized liquids in the contaminated soil.

Figure 8:
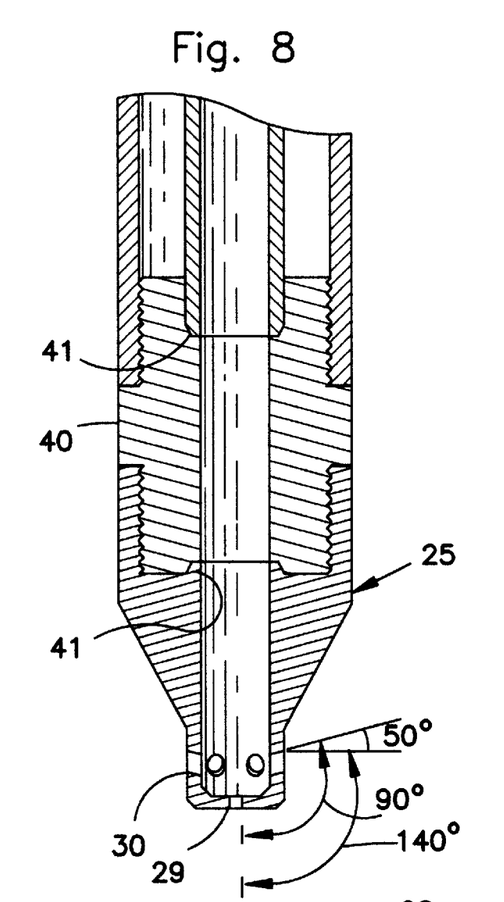
FIG. 8 is a crossectional view of FIG. 7 taken through FIG. 7 at points 8—8.
Figure 9:
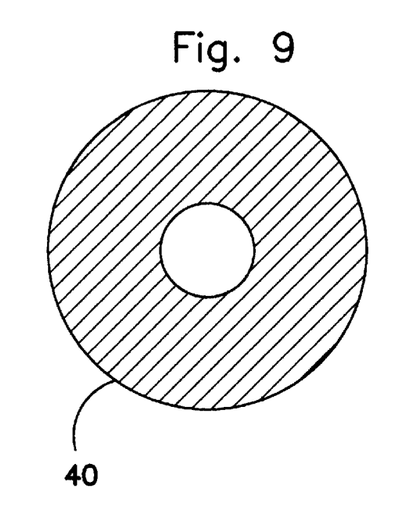
FIG. 9 is a crossectonal view of FIG. 7 taken through FIG. 7 at points 9—9.
Figure 10:
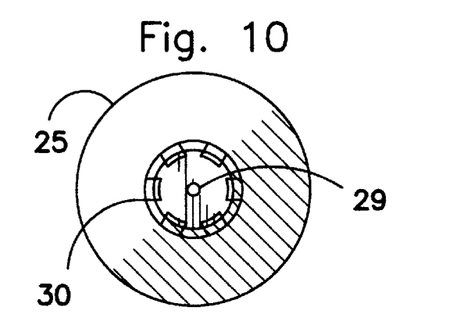
FIG. 10 is a head on view of nozzle tip looking at the forward port and the at least two side port members are shown in hidden lines.

A nozzle member 25, as best shown in FIG. 8, is connected to the other end 27 of the soil penetrating lance 10 in fluid communication with the-first tubular member 22 and the liquid connection valve 18 for directional delivery of the pressurized liquids into the contaminated soil as the soil is penetrated by the soil penetrating lance 10.

The directional delivery of the pressurized liquids is achieved at least in this embodiment by the nozzle member 25, as best shown in FIG. 8, having a forward nozzle port 29 for delivery of the high pressured liquid in very low volumes. The directional delivery of the pressurized liquids is further achieved, as shown in FIG. 8, by the nozzle member 25 having at least two side ports 30, which in this embodiment are tilted back away from the forward nozzle port 29 at least 150 degrees and are positioned away from the forward nozzle port 29. It should be understood by those skilled in the art that this angle may vary depending on the particular application, but it has been found that the optimum is from 90 degrees to 150 degrees as this provides some hydro drilling effect but does not create so much flow backward to interfere with the compressed gas injection.

It will be appreciated by those skilled in the art that this high pressure and low volume is achieved by sizing the nozzle port 29 and side ports 30 to the pressure being supplied by the liquid pump 16 to achieve this effect. The purpose of the effect is to obtain some drilling power from the high pressure liquid to assist the penetration of the soil penetrating lance 10 as well as to inject the water, hydrogen peroxide, biologicals, surfactants, nutritrants or other chemicals into as wide a treatment pattern as can be achieved around the soil penetrating lance 10.

Figure 11:
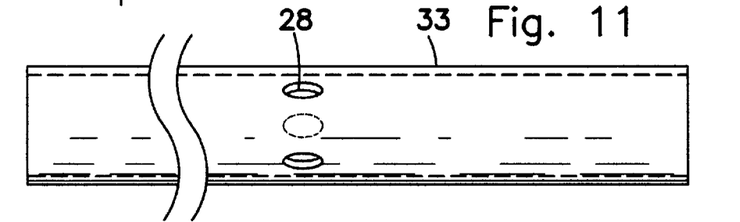
FIG. 11 is a side view of the at least one compressed gas port in the second tubular member for delivery of pressurized gas.

At least one compressed gas port 28 as shown in FIG. 1 and FIG. 11 may be provided, but in this embodiment there are four such compressed gas ports 28. It will be understood by those skilled in the art that more gas ports may be used, but it would be by designers choice for the particular application being designed. These compressed gas ports 28 are connected in fluid communication with the gas connector valve 13 for delivery of the pressurized gas to the contaminated soil for oxygenating the soil and pressurized liquid after the pressurized liquid is delivered in the contaminated soil.

It should be understood that the compressed gas ports 28 are located on the other end 27 of the soil penetrating lance 10 and located a distance sufficiently away from the nozzle's forward port 29 and side ports 30 that the liquid discharged has a chance to reduce it's pressure after injection in to the soil and before it comes in contact with the compressed gas port 28 in the second tubular member 23. The purpose is to prevent some of the liquids from going up the gas ports 28 and cause clogging and reduced compressed gas from being injected into the contaminated soil. Further it should be understood that better turbulence and mixing of the gas occurs when the pressured liquid is laid in first and then the compressed gas applied to the liquid. The most desired situation is to have as much of the gas dissolved in the liquid as possible because the biologicals and nutrients in the liquid depend on the oxygen supply delivered in the compressed gas and in some cases the hydrogen peroxide in the liquid to feed the biologicals in their process of remediating the contaminated soil.

It will be appreciated that the soil penetrating lance 10 can be made in various lengths to penetrate to various depths for the in-situ bioremediation, but it has been found that it is more practical to have the soil penetrating lance 10 in selected sizes from 6 to 12 feet in certain embodiments and then provide extension pieces to extend the operating range of the soil penetrating lance 10. One of the problems in having extension pieces is maintaining the functional integrity as the pieces are added to extend the operating range.

In one embodiment as shown in FIG. 2, FIG. 3, and FIG. 4 an extension member 31 is shown added to either the other end 27 of the soil penetrating lance 10 or another extension member 31. Because the connections would be the same as those shown in the above figures whether an extension member 31 or the other end 27 of the soil penetrating lance 10, the discussion about their functions of connection will be the same. One of the positive features of this invention is that it has so many common of parts and they are interchangeable to a great extent.

As will be seen, the extension member 31 is formed from a first and second tubular member 22 and 23 respectively having both ends 33 prepared for receiving an adapter tube member 32. The adapter tube member 32 in turn has both of it's ends 34 prepared for union with the extension member ends 33. In FIG. 2 it can be seen how the two pieces come together. In FIG. 3 it can be seen how the final union occurs. The adapter tube member 32 however must provide a fluid communication between the sections of the extension member 31 for the flow of the compressed air and this is achieved by the gas communication port 35 which is open on each end 36. The adapter tube member 32 must also provide a liquid flow way 37 for liquid flow. The liquid flow way is formed by the self centering seating surfaces members 38 on the adapter tube member 32 which engage the seating surfaces 39 of the first tubular member 22, so that once the two pieces are secured there is full communication of both the compressed gas and the liquid therethrough. In FIG. 5 it will be clearly seen that the gas communications ports 35 may be very numerous to enhance the free flow of the compressed gas.

An adapter nozzle member 40 is also provided for the attachment of the nozzle member 25 to either the other end 27 of the soil penetrating lance 10 or to an extension member 31, if one was being used. The adapter nozzle member 40 is threaded on both ends 52 for the joining with the nozzle member 25, which has matching threads, not shown, and to either the other end 27 of the soil penetrating lance 10 or to an extension member 31, either of which has matching threads, not shown. The adapter nozzle member 40 further has a self centering seating surface 41 as can best be seen in FIG. 8 for forming a seal between the first tubular member 22 and the adapter nozzle member 40. This self centering seating surface 41 is also provided for centering the first tubular member 22 within the second tubular means 23 and yet allow the liquid flow through the adapter nozzle member 40 to the nozzle forward port 29 and nozzle side ports 30 for dispersing liquid therefrom.

The lance handle 21 can best be seen in FIG. 1. It has in this embodiment at least one hand gripping surface 42 for holding the soil penetrating lance 10 and for providing at least one surface for receiving a driving force to assist the penetration of the contaminated soil. In this embodiment there are two such hand gripping surfaces 42 such that the operator may push the soil penetrating lance into the contaminated soil and control both the soil penetrating lance 10 as to direction and as to the depth of penetration.

Also associated with the lance handle 21 is a slide channel 43 which is adapted for adjustable movement up and down the length of the soil penetrating lance 10 and any extension members 31 which may be attached thereto. This lance handle 21 is further adapted for releasable affixing of the slide channel 43 up and down the length of the soil penetrating lance 10 so that when it is affixed the operator's downward force on the lance handle 21 is transferred to the soil penetrating lance 10 to drive it into the contaminated soil. It should be understood that once the soil penetrating lance 10 and lance handle 21 are driven proximate the ground the liquid connection valve 18 and the gas connector valve 13 are turned off. Then the operator would add an adapter tube member 32 and an extension member 31 to the soil penetrating lance 10 and turn the liquid connection valve 18 and the gas connector valve 13 on again and continue the treatment and driving the soil penetrating lance 10 into the contaminated soil. The operator by knowing the length of the soil penetrating lance 10 and the length of the extension members 31 between the adapter tube members 32 can easily compute and measure the depth of penetration from one lance handle 21 fixed position to the next thereby giving an easy means to measure and control the penetration of the soil penetrating lance 10 during the bioremediation process.

The releasable affixing of the slide channel 43 is achieved by the slide channel 43 being releasably squeezed in the slide channel 43 by a releasable squeeze fitting 44 which has two sides 45A and 45B split apart by a space and a helical screw member 46 for alternately squeezing and releasing of the slide channel 43 about the soil penetrating lance 10 upon the helical screw member 46 being advance forward and then reversed. Those skilled in the art will realize that there may be many themes and variations of the releasable affixing of the lance handle 21 and this one disclosed is just one embodiment thereof.

From the foregoing discussion those skilled in the art will realize that this deep remediation injection system could be mounted on a small trailer and towed to the in-situ site to provide the treatment of the contaminated soil.

The deep remediation injection system for in-situ remediation of contaminated soil and ground water is most effective using the methods which will be outlined below. Clearly those skilled in the art will realize that these teachings are only suggested embodiments and that others may be used without departing from the teachings and claims herein disclosed.

The first step in the method is to evaluate the type of soil contaminates and their concentrations so that the proper biologicals and formulations can be selected and a calculation of how many of them will be needed and how much nutrients and oxygen will be needed to support the biologicals and formulations in their remediation process. After that step then evaluating the soil field capacity to determine the liquid which can be added for treatment is necessary to determine the volume of liquid which will be used with the biologicals at the time of injection into the contaminated soil is the next step. Under certain conditions some of the liquid will be hydrogen peroxide which serves both the liquid function, but also serves to supply a rich oxygen source for the biologicals. After the above two steps have been performed then there is the step of developing a treatment grid regarding the depth of treatment and as to the spacing of the penetration holes in the contaminated soil and how long a time to hold the soil penetrating lance 10 with the nozzle member 25 at each downward penetration step to achieve the desired concentration of liquid biologicals and air and oxygen.

Figure 14:
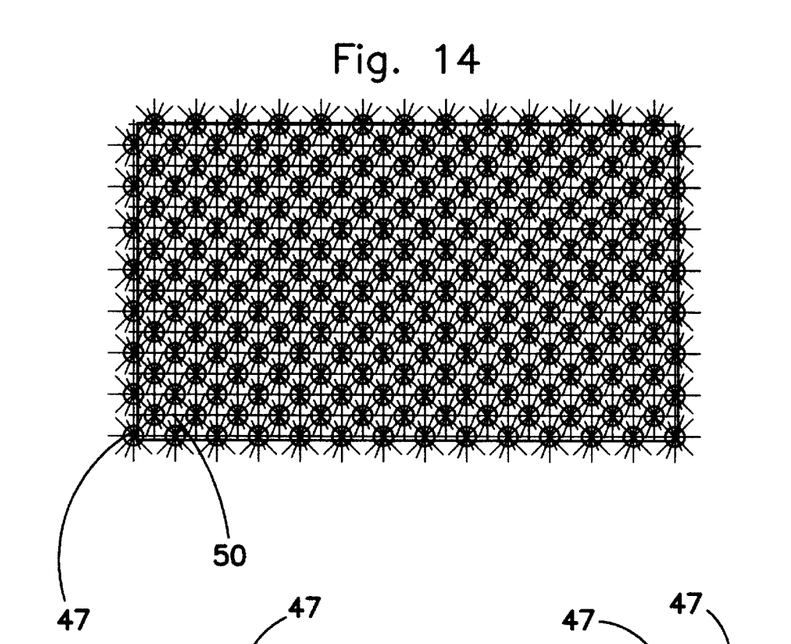
FIG. 14 is a diagrammatic representation of a top view of contaminated soil which has been treated with this system and method showing the diamond pattern used for complete overlapping coverage of the contaminated soil.
Figure 15:
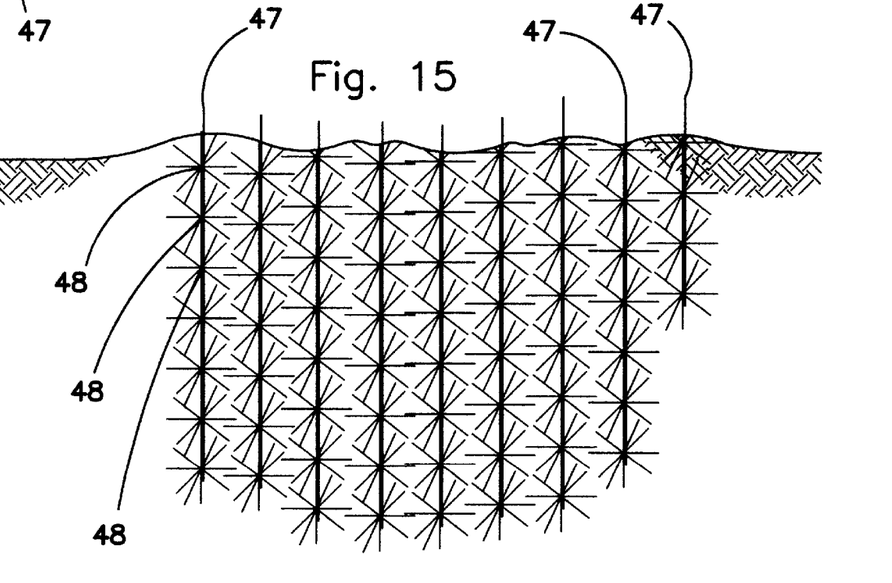
FIG. 15 is a diagrammatic representation of side sectional view of the contaminated soil of FIG. 14 which has been treated with this system and method showing how the column of soil along the axis of the lances penetration has treated the soil for bioremediation.

In FIG. 14 and FIG. 15 it can be seen how such a plan of treatment would be developed and laid out relative to the treatment grid which has both a vertical and horizontal component for the treatment of the contaminated soil. For example in FIG. 15 it can be seen that there are several axial penetration lines 47 with stepped penetration points 48 thereon. In the application of the method of this invention a predetermined concentration of biologicals and oxygen and nutrients would be delivered for a predetermined amount of time at each of the stepped penetration points 48. From FIG. 14 and FIG. 15 it can also be seen that the distance from the axial penetrations lines is in such proximity that there is overlap from the dispersal of the biologicals and oxygen and nutrients at each of the stepped penetration points 48.

After all the above steps of the method have been performed then it is time for the mixing of the biological and placing them in a pump reservoir 49 and activating the pump 16 to pressurize the water for injection. Also at this time the activating of the compressor 11 would occur to compress the gas to be injected with biological through the soil penetrating lance 10.

Once the system is fully pressurized then the liquid connection valve 18 and gas connection valve 13 would be turned on and the operator would start driving the soil penetrating lance 10 into the contaminated soil, but stopping the soil penetrating lance 10 at stepped penetration points 48 for a sufficient time to treat the soil and then continuing the diving of the soil penetrating lance into the contaminated soil to the next stepped penetration point 48 until the whole in-situ remediation axial penetration line 47 is completed. The operator would then follow the plan and start another axial penetration line 47 and continue the process until the whole in-situ remediation site has been treated.

It has been determined that the best results on the locating of the axial penetration line 47 is by forming a diamond shaped pattern indicated generally at 50 and as seen in FIG. 14 for the grid as it provides better overlap of the stepped penetration points 48 and axial penetration lines 47.

From the foregoing it will be understood by those skilled in the art that the contaminated soil is treated in-situ as a column of soil with overlap of each column to achieve complete treatment. Those skilled in the art will realize that the size of the column will change with the soil conditions. For example if the contaminated soil is sand the column would have approximately a radial penetration of five feet from the point of injection in the soil column. In the case of contaminated clay soil the column would have approximately a radial penetration of three feet. Clearly a mixed soil of sand and clay would have some combination between the two pure soil types. Other soil types would require some trial and error by those skilled in the art to find the optium radial penetration.

Since a column or cylinder of soil is being treated the volume of soil impacted by the deep remediation injection system and method is determined by the computation of the volume of the soil in the cylinder or the equation of Volume=height of the column ( pi (radius squared)). Once the total volume of soil to be treated is determined then based on the type soil and it porosity calculation can be made to determine the total pore volume available in the soil. Then as those skilled in the art will understand calculations can be made to determine the volume of water and suspended biological and formulations which are needed to saturate a stepped penetration point 48 and how long it will take given the flow rate of the nozzle member 25. These calculations determine how long the operator must leave the soil penetrating lance 10 at each stepped penetration point 48.

Figures 12, 13:
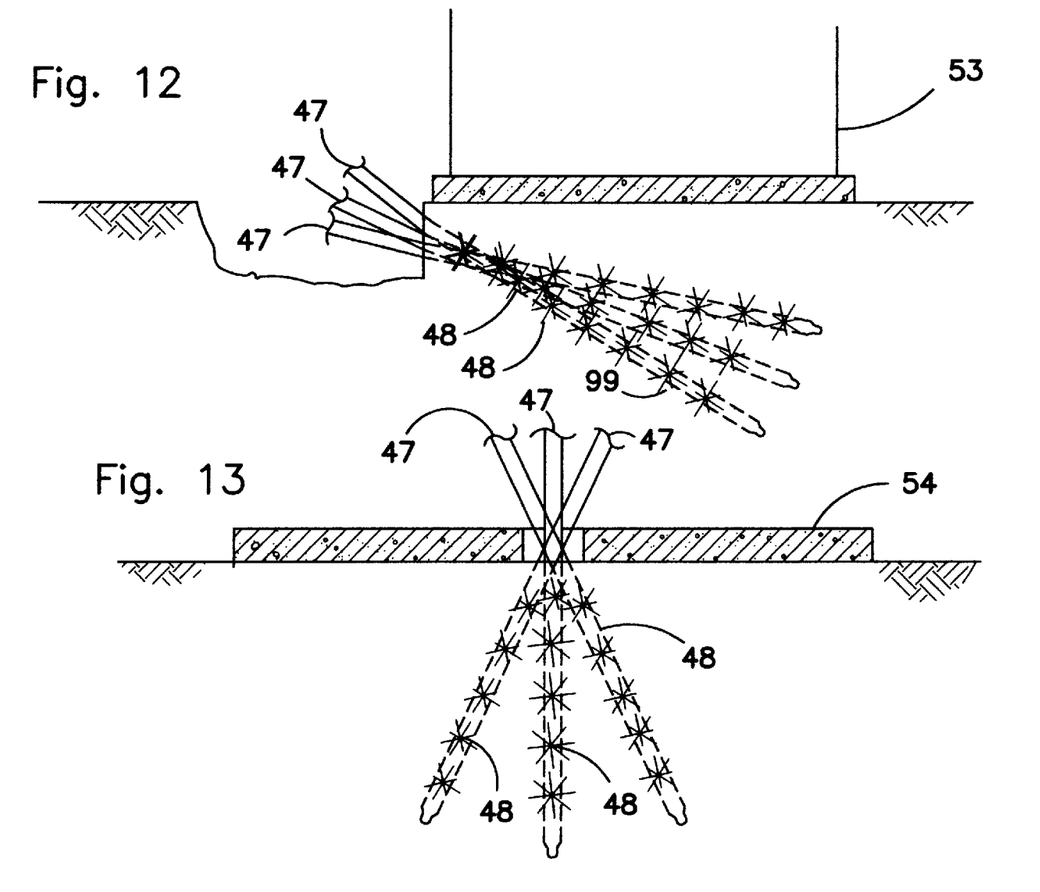
FIG. 12 is a side sectional view showing how the lance of this system is used to provide treatment under existing structures to treat contaminated soil, by using an access trench and multiple angles of penetration.
FIG. 13 is a side sectional view showing how the lance of this system is used to provide treatment through a concrete slab by using a treating hole in the concrete and using multiple angles of penetration.

From the foregoing teachings it should be understood that the axial penetration lines 47 can also be directed on a slant to allow remediation under building 53, as shown in FIG. 13. Also remediation may be achieved under slabs 54 by placing a small access hole 55 through the slab 54 and angling the axial penetration line 47 outward therefrom.

Also from the teachings of this invention it should be understood that it may be used with other remediation systems such as the large bore hole remediation process to hit areas which need specialized attention or have special problems or need special chemicals for the remediation process. Also the system of this invention can be used in the specialized site area which have had contaminated dirt hauled in for treatment because the system can be used to treat piles of contamined soil just as well. It can also be used with the drilled in collection line systems as an hancement to the other process being applied.

As is apparent from the foregoing specification, the present invention is susceptible of being embodied with various alterations and modifications which may differ particularly from those that have been described in the preceding specification and descriptions. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A deep remediation injection system for in-situ remediation of contaminated soil and ground water capable of progressive penetration both vertically and horizontally in contaminated soil comprising a soil penetrating lance for injecting air and oxygen and liquid with suspended biologicals into said contaminated soil as said soil penetrating lance is inserted for penetration therein;

an air compressor means for compressing air and delivering said air under pressure to said soil penetrating lance on one end, a liquid pump means for pressurizing the liquid, oxygen, and suspended biologicals and delivering said liquid and suspended biologicals under pressure to said soil penetrating lance on one end, a gas connector means for connecting said gas compressor to said lance and for controlling said compressed gas flow, and a liquid connector means for connecting said liquid pump to said lance and for controlling said pressurized liquids.

2. A deep remediation injection system of claim 1 wherein said lance comprises a first tubular means in communication with said connector means for delivery of said pressurized liquids therethrough and for discharge under pressure into said contaminated soil, a second tubular means in communication with said connector means for delivery of said compressed gas therethrough and having a diameter sufficient to receive said first tubular means therein and allow sufficient compressed gas to flow therethrough for the in-situ remediation of contaminated soil when mixed with said pressurized liquids in said contaminated soil, a nozzle means connected to the other end of said lance and connected to said first tubular means in fluid communication with said liquid connector means for directional delivery of said pressurized liquids into said contaminated soil as said soil is penetrated, and at least one compressed gas port in said second tubular means in fluid communication with said gas connector means for delivery of said pressurized gas into said contaminated soil for oxygenating said soil and pressurized liquid after said pressurized liquid is delivered into said soil.

3. A deep remediation injection system of claim 2 wherein said nozzle means further comprises a forward port means sized for delivery of said high pressure liquid at high pressure and at low volumes and positioned on the distal most end of said nozzle from said lance and at least two side port means located along said side of said nozzle means and away from the most distal end of said nozzle toward the other end of said lance for delivery of said high pressure liquid at high pressures and at low volumes.

4. A deep remediation injection system of claim 3 wherein said forward port means and said at least two side port means on said nozzle are located on the other end of said lance and said at least one compressed gas port is located a distance sufficiently away from said nozzle that said liquid discharged is reduced to lower pressure after injection before said at least one compressed gas port in said second tubular means is in contact with said liquid discharged for the discharge of said compressed gas there through.

5. A deep remediation injection system of claim 4 wherein said at least two side port means located along said side of said nozzle means are directed away from said forward port means from 90 degrees to 140 degrees for delivery of said high pressure liquid at low volumes and for assisting in penetrating soil as said soil penetrating lance is advanced into said contaminated soil.

6. A deep remediation injection system of claim 5 further comprising an extension means of predetermined length made from said first and second tubular means and having each end of said first and second tubular means prepared for receiving an adaptor means, and an adapter tube means having each end adapted for being joined for union with an extension means formed from one of said first and second tubular means for extending the length of said soil penetrating lance and for centering said first tubular means within said second tubular means and for sealing each of said first and second tubular means for fluid flow through each respective first and second tubular means.

7. A deep remediation injection system of claim 6 wherein said adapter tube means further comprises:

at least one gas communication port through said adapter tube means open on each end and adapted for being joined to said extension means for connecting gas communication through said adapter tube means and said extension means connected thereto.

8. A deep remediation injection system of claim 7 wherein said adapter tube means further comprises a self centering seating surface means on each end of said adapter tube means for forming a seal between said first tubular means and said adapter tube means and for centering said first tubular means within said second tubular means and for allowing liquid flow through said adapter means.

9. A deep remediation injection system of claim 8 further comprising;

an adaptor nozzle means for connecting said nozzle means to said lance having self centering seating surfaces on each end of said adapter nozzle means for forming a seal between said first tubular means and said adapter nozzle means and for centering said first tubular means within said second tubular means and for allowing liquid flow through said adapter means.

10. A deep remediation injection system of claim 9 further comprising;

a handle means connected to said soil penetrating lance for holding said lance and for providing at least one surface for receiving a driving force to assist in the penetration of said contaminated soil and for controlling the direction and rate of penetration into said contaminated soil.

11. A deep remediation injection system of claim 10 wherein said handle means is adapted for adjustable movement up and down the length of said lance and for releasable affixing of said handle means up and down the length of said lance for providing fixed points along said lance for driving said lance into said contaminated soil and then releasing said handle means for movement to another fixed point and re-affixing said handle means for driving said lance into contaminated soil again.

12. A deep remediation injection system of claim 11 wherein said handle means further comprises a releasable squeeze fit means for sliding up and down the length of said lance and for affixing said handle means by squeezing said squeeze fit means about said lance; and a helical screw means for providing the squeezing and releasing of said releasable squeeze fit means about said lance.

13. A deep remediation injection system of claim 12 wherein said lance means and extension means are measures of penetration depth from one handle fixed position to the next for controlled and measured penetration of said contaminated soil.

14. A method of using a deep remediation injection system for in-situ remediation of contaminated soil and ground water capable of progressive penetration both vertically and horizontally in contaminated soil using the deep remediation injection system of claim 1 comprising;

evaluating said contaminated soil as to contaminates and concentration, evaluating the soil field capacity of said contaminated soil to determine the liquid which can be added for treatment, developing a treatment grid both as to depth of treatment and as to spacing of penetration holes in said contaminated soil, and holding time for each downward penetration step, activating a compressed gas source for injection, activating a pressured liquid and suspended biological source for injection, driving said soil penetrating lance into said contaminated soil, stopping said lance penetration at steps of penetration for time sufficient to treat said soil, and driving said soil penetrating lance into said contaminated soil to the next stop for treatment until the whole in-situ remediation site has been treated.

15. The method of claim 14 using a deep remediation injection system for in-situ remediation of contaminated soil and ground water capable of progressive penetration both vertically and horizontally in contaminated soil using a deep remediation injection system comprising;

mixing biologicals, nutrients, hydrogen peroxide, water, surfactant, and other biological enhancing and stimulating chemicals for bio-remediation, prior to activating said pressured liquid and suspended biologicals.

16. The method of claim 15 using a deep remediation injection system for in-situ remediation of contaminated soil and ground water capable of progressive penetration both vertically and horizontally in contaminated soil using a deep remediation injection system comprising;

forming a diamond shaped pattern for said grid for driving said soil penetrating lances into said contaminated soil.

* * * * *